Oct. 19, 1926.

A. F. BREITENSTEIN 1,603,446

FIXTURE FOR GRINDING THE TEETH OF CHASERS

Filed Nov. 14, 1924    5 Sheets-Sheet 1

Oct. 19, 1926.  
A. F. BREITENSTEIN  
1,603,446  
FIXTURE FOR GRINDING THE TEETH OF CHASERS  
Filed Nov. 14, 1924    5 Sheets-Sheet 3

Inventor  
Albert F Breitenstein  
by Seymour Earle  
atty

Oct. 19, 1926.

A. F. BREITENSTEIN 1,603,446

FIXTURE FOR GRINDING THE TEETH OF CHASERS

Filed Nov. 14, 1924    5 Sheets-Sheet 4

Inventor
Albert F Breitenstein
by Seymour & Earle
attys

Oct. 19, 1926.

A. F. BREITENSTEIN

1,603,446

FIXTURE FOR GRINDING THE TEETH OF CHASERS

Filed Nov. 14, 1924   5 Sheets-Sheet 5

Patented Oct. 19, 1926.

1,603,446

UNITED STATES PATENT OFFICE.

ALBERT F. BREITENSTEIN, OF NEW HAVEN, CONNECTICUT, ASSIGNOR TO THE GEOMETRIC TOOL CO., OF NEW HAVEN, CONNECTICUT, A CORPORATION.

FIXTURE FOR GRINDING THE TEETH OF CHASERS.

Application filed November 14, 1924. Serial No. 749,839.

I do hereby declare the following, when taken in connection with the accompanying drawings and the characters of reference marked thereon, to be a full, clear and exact description of the invention, and which said drawings constitute part of this application, and represent, in—

My invention relates to an improved fixture for grinding the teeth of chasers and the like, the object being to provide a fixture, whereby the teeth of a complete set of chasers may, in one grinding operation of the fixture, be ground, with a degree of accuracy heretofore unknown, at a greatly reduced cost for time and labor.

With these ends in view, my invention consists in a reciprocating fixture for grinding the teeth of chasers, having a chaser-carriage, chaser-holders mounted therein, and means connected with the respective chaser-holders for positioning the chasers mounted therein in stepped interrelation so that their teeth will track.

My invention further consists in a reciprocating fixture for grinding the teeth of chasers, having a chaser-carriage, and means for positioning the chaser-carriage to bring the chaser-teeth into parallelism with the line on which the fixture reciprocates.

My invention also consists in a reciprocating fixture for grinding the teeth of chasers, having a chaser-carriage, an intermediate-member on which the said chaser-carriage has rectilinear movement at a right angle to the line on which the fixture reciprocates, means for turning the said intermediate-member upon a center for bringing the chaser-teeth into parallelism with the said line, a base-member carrying the said intermediate-member, and means for the step-by-step movement of the chaser-carriage at substantially a right angle to the said line.

My invention further consists in a fixture for grinding the teeth of chasers, having certain details of construction and combinations of parts as will be hereinafter described and particularly pointed out in the claims.

The accompanying drawings illustrate the embodiment of my invention in a fixture designed for simultaneously grinding the teeth of six chasers of the type used in a standard expanding die-head or collapsing tap. However, the number of chasers in a set, or the number of sets of chasers concurrently ground, is immaterial.

Figure 2:
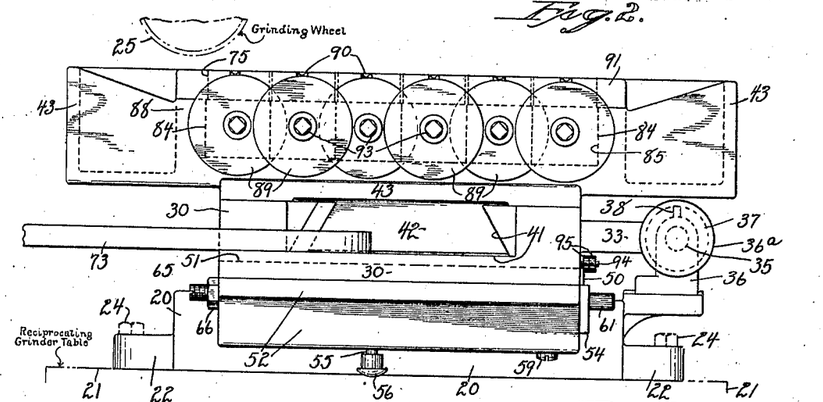
Fig. 2 a view thereof in front elevation.
Figure 3:
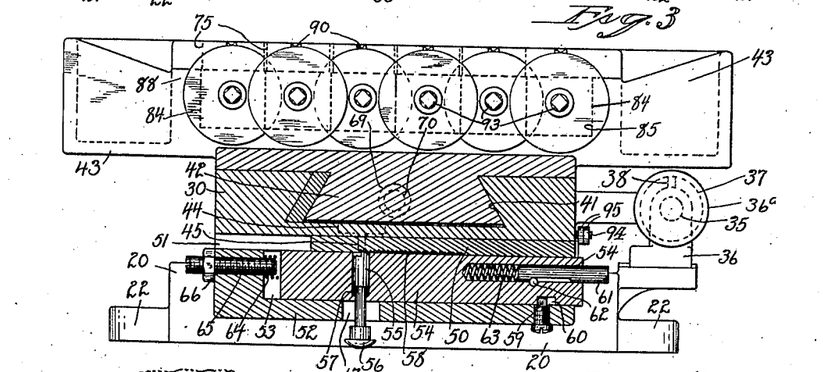
Fig. 3 a sectional view on the line 3—3 of Fig. 1.
Figure 4:
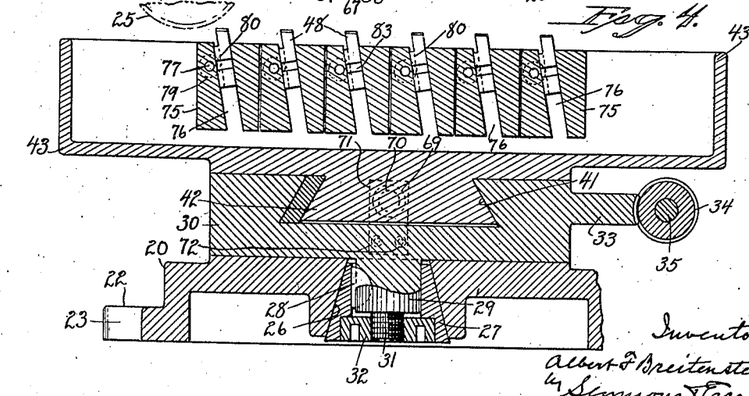
Fig. 4 a sectional view on the line 4—4 of Fig. 1.

In carrying out my invention, as herein shown, I employ a base-member 20, designed to be mounted upon the reciprocating table 21 (indicated by broken lines in Fig. 2) of any approved grinding machine. As shown, the said base-member 20 is formed at its ends with flanges 22 having notches 23 receiving bolts 24, by which it is secured to the said table with which it reciprocates, as well as the parts carried by it, beneath the grinding-wheel 25 (indicated by broken lines in Figs. 2 and 4).

The said base-member 20 is formed with a downwardly-flaring, conical seat 26 receiving a conical bushing 27 secured by a key 28 to a stud 29 depending from the intermediate-member 30 of the fixture, and provided with a threaded stem 31 receiving a nut 32 recessed into the said bushing and designed to force the same upward in the conical seat thereof, so as to maintain it at all times in close bearing-contact therewith. Under the described construction, the intermediate-member 30 may be turned with respect to the base-member 20, upon the said conical bushing as a center.

Figures 9, 10:
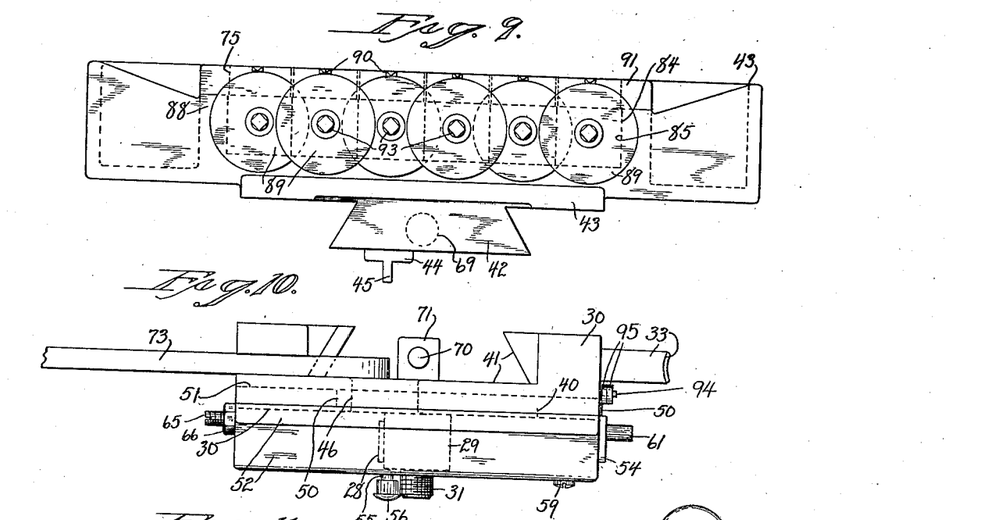
Fig. 9 a detached view in front elevation of the chaser-carriage.
Fig. 10 a similar view of the swiveled intermediate-member.

For the "close," or accurately-measured turning of the swiveled intermediate-member 30 upon the base-member 20, the former is provided with an offsetting worm-wheel sector 33 meshed into by a worm 34 mounted on a shaft 35 journaled in a bearing-block 36 secured to the base-member 20. At its outer end, the shaft 35 is provided with a knurled hand-wheel 36ª and a graduated dial 37. Each subdivision of the said dial preferably represents an angle of one minute. This dial is read in conjunction with a zero mark upon a lug 38 upstanding from the bearing-block 36. The elements just above described provide for angle-readings to the fineness of minutes. For a coarser adjustment I locate suitable calibrations 39 on the base-member (Figs. 5 and 11), to be read in conjunction with an index mark 40 (Figs. 5 and 10) upon the intermediate-member.

The said swiveled intermediate-member 30 has, in its upper face, a wide, undercut groove 41 receiving a corresponding dovetail-rib 42 depending from the lower face of a tray-like chaser-carriage 43, which has step-by-step movement independent of the other parts of the fixture in the reciprocating movement of which, as a whole, it also participates, its step-by-step movement being from rear to front at a right angle to the line on which the fixture reciprocates as a unit.

Figure 8:
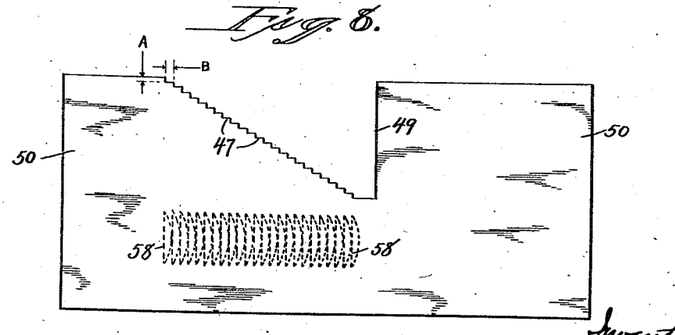
Fig. 8 a detached, plan view of the gauge-plate.

To provide for the said step-by-step movement of the chaser-carriage, the under-face of the dovetail-rib 42 thereof is provided, near its forward end, with a small block 44 having a depending, flange-like finger 45 extending downward through a clearance-opening 46 in the intermediate-member 30, in position to engage in succession with a series of regular steps 47 corresponding in depth, as indicated at A in Fig. 8, to the distance between, or pitch, of the teeth of the chasers 48 of the set of chasers being ground, the said steps being located in the long reach of a deep, triangular cut 49 in the rear edge of a gauge-plate 50, located in a downwardly-opening recess 51 in the lower face of the overhanging front portion of the intermediate-member 30, and retained therein by a bearing-plate 52 secured to the lower face of the said overhanging front portion of the member 30, extending throughout the width thereof and so providing a bearing for the under-face of the gauge-plate 50.

The bearing-plate 52 is formed with a deep longitudinal groove 53 receiving a gauge-plate feed-bar 54 carrying an upstanding, spring-actuated pawl 55 furnished at its lower end with a finger-button 56 and provided at its upper end with a tooth which is normally maintained by a spring 57 in engagement with one of the teeth of a longitudinally-arranged series of ratchet-teeth 58 formed in the under-face of the gauge-plate and respectively aligned with the several steps 47 therein. A screw-stud 59, mounted in the right-hand end of the plate 52, enters a notch 60 in the right-hand end of the bar 54 and limits the endwise movement thereof. At its right-hand end, the said bar is provided with an operating-plunger 61 limited in movement by a pin 62 and normally held in its projected position by a helical spring 63. The left-hand end of the bar impinges upon a helical spring 64 of lower resistance than the spring 53 and encircling the inner end of a stop-screw 65 located in the left-hand end of the bearing-plate 52 and locked in any one of its said positions by a nut 66, the inner end of the said screw 65 projecting into the left-hand end of the deep groove 53 aforesaid in the plate 52. A clearance slot 67, leading out of the bottom of the groove 53, provides for the endwise movement of the stem of the pawl 55 as the same moves back and forth with the feed-bar 54.

Figure 6:
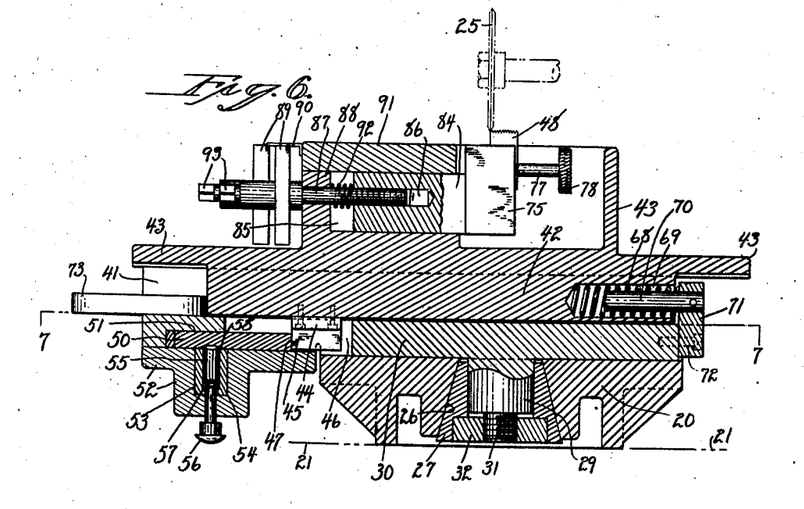
Fig. 6 a sectional view thereof on the line 6—6 of Fig. 1.
Figure 7:
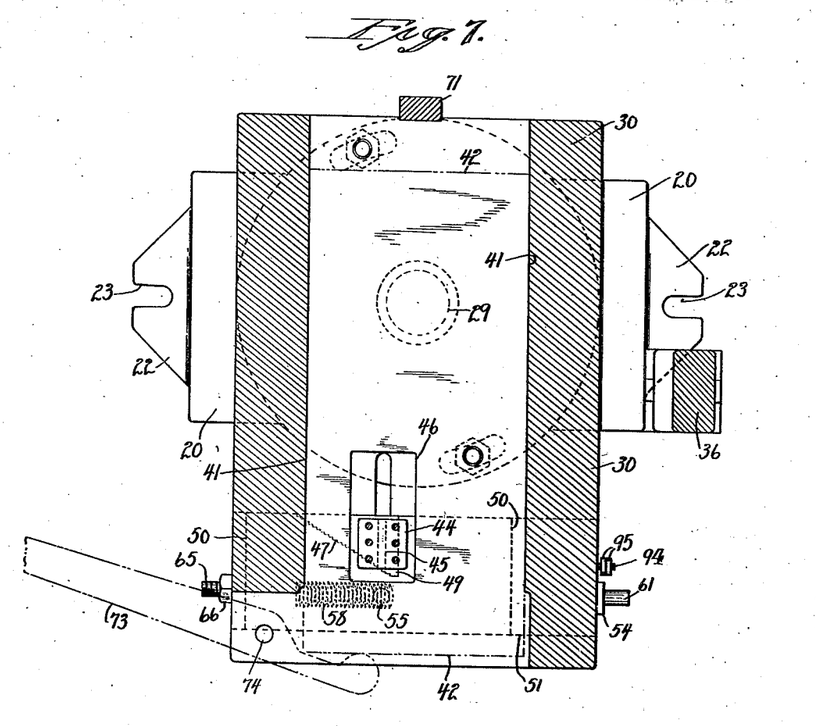
Fig. 7 a horizontal, sectional view on the line 7—7 of Fig. 6, showing the parts of the fixture in the positions due to them near the completion of a grinding operation.

For the rear-to-front, step-by-step movement of the chaser-carriage 43, under the control of the gauge-plate 50, I employ a helical operating-spring 68 (Fig. 6) located in a deep bore 69 in the rear end of the dovetail-rib 42 of the said carriage, the said spring encircling a guide-pin 70 mounted in an arm 71 fastened by screws 72 to the rear end of the intermediate-member 30, the outer end of the said spring 68 impinging against the inner face of the said arm 71, and its inner end against the forward end of the bore 69.

For moving the chaser-carriage from front to rear, preliminary to the beginning of each grinding operation, against the tension of its operating-spring 69, I employ a hand-lever 73 pivoted upon a pin 74 in the forward left-hand corner of the intermediate-member 30 and engaging at its rounded inner end with the forward end of the dove-tail-rib 42.

Figures 11, 12, 13, 14, 15, 16, 17, 18:
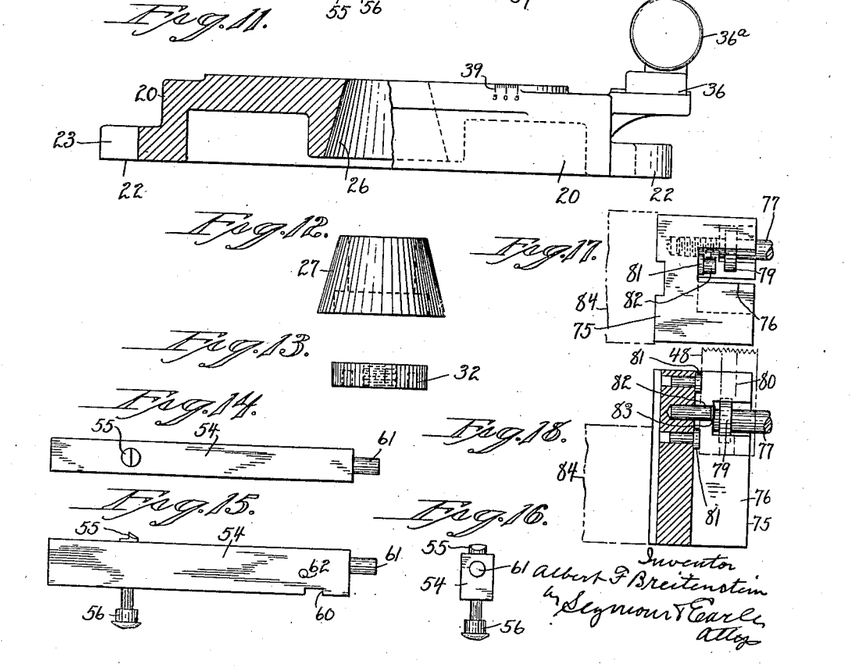
Fig. 11 a similar view of the base-member, shown partly in section.
Fig. 12 a similar view of the conical bushing.
Fig. 13 a similar view of the retaining-nut therefor.
Fig. 14 a detached, plan view of the gauge-plate feed-bar.
Fig. 15 a side view thereof.
Fig. 16 an end view thereof.
Fig. 17 a broken, plan view, on an enlarged scale, of one of the chaser-holders.
Fig. 18 a sectional view thereof.

The six chasers 48 of the set are respectively mounted in six similar chaser-holders 75, each provided with an inclined groove 76 for the reception of the lower ends of the chasers, the inclination of these grooves providing for the usual "back-off", or clearance, of the chaser-teeth. Each chaser-holder 75 mounts a clamping-screw 77, provided at its outer end with a knurled hand-wheel 78 and near its inner end with a clamping-collar 79 entering the key-groove 80 of the chaser and jamming the same against gauge-pins 81 also mounted in the chaser-holder (Figs. 17 and 18). To limit the downward movement of the chasers in the said slots 76, each chaser-holder is provided with a stop-pin 82 entering the lug-notch 83 in the chaser, as shown in Fig. 17.

The several chaser-holders 75 are secured to the rear ends of as many slide-blocks 84 located in a channel 85 in the chaser-carriage 43 and bearing side-by-side upon each other. Each block 84 is formed with a threaded bore 86 receiving an adjusting-screw 87 mounted in the front wall 88 of the said chamber 85. Each of the said adjusting-screws is also provided with a calibrated dial-wheel 89 reading in connection with a pointer 90 secured to a cover-plate 91 extending over the tops of the six blocks 84 and confining them in the chamber 85. Each of the said screws 87 is also provided with a helical spring 92 arranged to exert a constant effort to crowd its particular block 84 rearward, so as to take up backlash, while the projecting forward end of each screw is squared at 93 for the application of an adjusting wrench. By providing each of the chaser-holders with means such as described for positioning it with respect to its fellows, I am enabled to inter-relate the several chasers 48 to be ground at one and the same grinding operation, so that their teeth will track, in accordance with their helical character, since the first tooth, let us say, of No. 1 chaser, of a six-chaser set, will occupy a different position with respect to the chaser itself than will the first threads of each of the remaining five chasers of the set, and so on. The intermediate-member 30 is furnished with a stop-screw 94 carrying stop-nuts 95 for positioning the gauge-plate 50.

In the use of my improved chaser-grinding fixture, as herein shown, the respective chasers 48 of a set of six chasers are installed in the respective chaser-holders 75. Knowing the thread-pitch (the distance between teeth), say .060 inch, of the given set of chasers to be ground, the adjusting-screws 87 are operated under the guidance of their dial-wheels 89, so that the No. 2 chaser, reading from left to right, will be moved forward 1/6 of the total pitch, which is .010 inch. No. 3 chaser will then be set forward 2/6 or .020 inch, No. 4 being set forward .030, No. 5 .040 and No. 6 .050.

The chasers having been interrelated, or relatively positioned, as described, the helical angle of the thread is provided for by turning the hand-wheel 36 under the direction of the calibrations on the dial 37, whereby the worm 38, through the worm-wheel sector 33, will turn the swiveled intermediate-member 30 on the bushing 27 as a center, until the said member 30 has been brought into the required angle with respect to the base-member 20. A gauge-plate 50 the steps of which are cut to a depth corresponding to the pitch of the chasers, that is to say, the distance separating their teeth, is now inserted into the left-hand end of the recess 51 in the lower face of the overhanging end of the intermediate-member 30 and pushed from left to right into the said recess until its right-hand end engages with the inner of the two stop-nuts 95 mounted upon the stop-screw 94 in the intermediate-member 30. Prior to this, the pawl 55 must have been retracted by pulling down its finger-piece 56, and the lever 73 must have been operated to crowd the chaser-carriage 43 from front to rear against the tension of its operating-spring 69, so as to clear the forward edge of the finger 45 from the gauge-plate 50. It should be explained, in this connection, that each fixture is provided with a series of gauge-plates 50 stepped to correspond with the pitch of the chasers to be ground.

Figure 1:
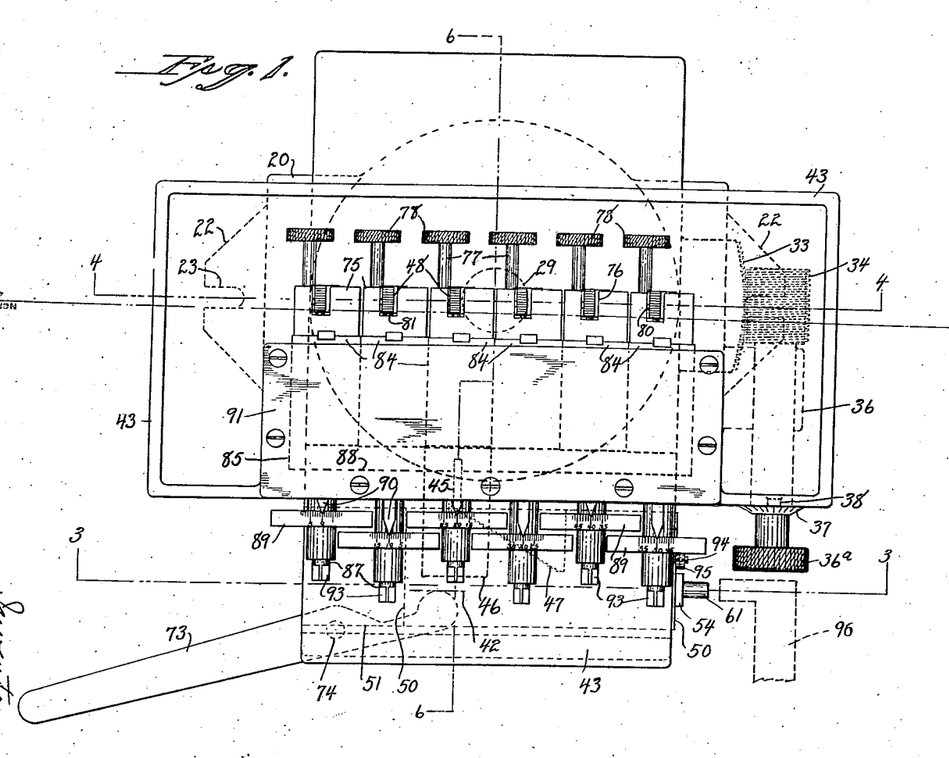
Fig. 1 a plan view of one form which a fixture embodying my invention for grinding the teeth of chasers may assume, the machine being shown as set for starting the grinding of a set of chasers.
Figure 5:
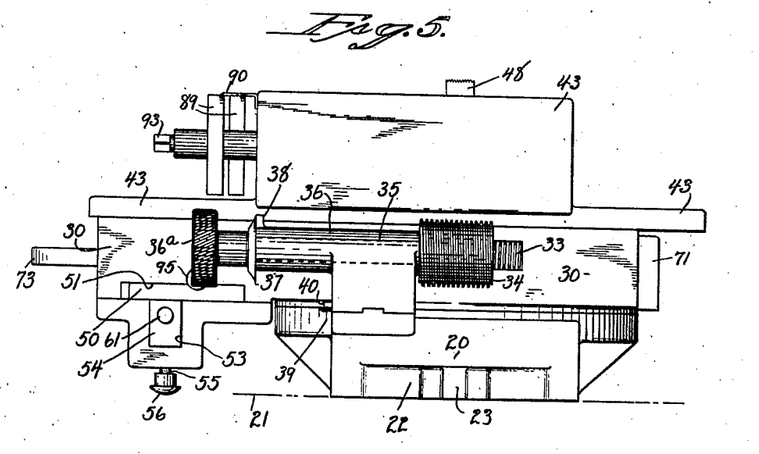
Fig. 5 a view of the fixture in right-hand end elevation.

The chasers of a set having been installed in the fixture and all of the adjustments thereof having been made with the utmost precision, the grinding machine is started, at which time the fixture, including the chasers, will be reciprocated sidewise as a unit under the revolving grinding-wheel 25, which will, on the left-hand stroke of such reciprocating movement, grind the first tooth of each chaser of the set as they pass beneath it. At the conclusion of the reverse stroke (to the right) of the fixture-unit, the projecting end of the operating-plunger 61 will engage with an abutment 96 (Fig. 1) but suitably located on a fixed part of the grinding-machine, with the effect of pushing the feed-bar 54 from right to left against the tension of the helical spring 64, which is enough weaker than the spring 63 to permit this movement without the compression of the said spring 63, which will not be compressed until after the left-hand end of the feed-bar 54 has been brought into engagement with the stop-screw 65. This movement of the feed-bar 54 operates, through the pawl 55, to correspondingly move, or hitch, the gauge-plate 50 from right to left for a distance represented by the width of one of the steps 47 (dimension B, Fig. 8). The described movement of the plate 50 permits the operating-spring 69 to step the entire chaser-carriage forward for a distance represented by the depth of one of the steps 47 in the gauge-plate (dimension A, Fig. 8). At the end of this movement of the plate 50, the finger 45 of the block 44 moves into engagement with the next lower step 47 in the plate 50. The described forward movement of the chaser-carriage, by one step, brings the second threads of the respective chasers in line with the grinding-wheel 25. During the succeeding bodily reciprocation of the fixture-unit, the second threads of the respective chasers will be brought into engagement with the grinding-wheel. At the start of this second cycle of reciprocating movement, the plunger 61 moves away from the fixed abutment of the grinding-machine and permits the spring 64 to assert itself to move the feed-bar 54 from left to right, whereby the pawl 55 rides idly over one tooth of the series of ratchet-teeth 58 in the lower face of the gauge-plate 50 and snaps into engagement with the next tooth to the right, so as to be in position to move the gauge-plate another step to the left, when, at the completion of this second complete reciprocation of the fixture-unit, the plunger 61 is brought into engagement with the fixed abutment of the grinding-machine. This second cycle of operation is repeated until all of the chaser-teeth have been successively aligned with and carried beneath the grinding-wheel 25, the chaser-carriage moving forward one step for each complete reciprocation of the fixture, i. e., from the starting position in which it is shown in Fig. 1, to its forward position in which it is indicated in Fig. 5. It will be noted that the shifting of the chasers, as required for grinding their teeth in succession, is purely an automatic operation.

I claim:

1. A reciprocating fixture for grinding the teeth of chasers, having a chaser-carriage, chaser-holders mounted therein, and means connected with the respective chaser-holders for positioning the chasers mounted therein in stepped interrelation so that their teeth will track.

2. A reciprocating fixture for grinding the teeth of chasers, having a chaser-carriage, chaser-holders mounted therein, means connected with the respective chaser-holders for positioning the chasers mounted therein in stepped interrelation so that their teeth will track, and means for positioning the chaser-carriage to bring the chaser-teeth into parallelism with the line on which the fixture reciprocates.

3. A reciprocating fixture for grinding the teeth of chasers, having a chaser-carriage, chaser-holders mounted therein, means connected with the respective chaser-holders for positioning the chasers mounted therein in stepped interrelation so that their teeth will track, a pivotal intermediate-member on which the said chaser-carriage has rectilinear movement at a right angle to the line on which the fixture reciprocates, means for turning the said intermediate-member upon its pivot for bringing the chaser-teeth into parallelism with the said line, a base-member carrying the said intermediate-member, and means for effecting a step-by-step movement of the chaser-carriage at substantially a right angle to the said line.

4. A reciprocating fixture for grinding the teeth of chasers, having a pivotal chaser-carriage, chaser-holders mounted therein, means connected with the respective chaser-holders for positioning the chasers mounted therein in stepped interrelation so that their teeth will track, means for turning the said carriage upon its pivot to bring the chaser-teeth into parallelism with the line on which the fixture reciprocates, and means for a step-by-step movement of the carriage at substantially a right angle to the said line.

5. A reciprocating fixture for grinding the teeth of chasers, having a chaser-carriage, chaser-holders mounted therein, means connected with the respective chaser-holders for positioning the chasers mounted therein in stepped interrelation so that their teeth will track, a swiveled intermediate-member upon which the said carriage slides, a base-member upon which the intermediate-member is swiveled, means for turning the said intermediate-member upon a center to bring the chaser-teeth into parallelism with the line on which the fixture reciprocates, and means for a step-by-step movement of the carriage upon the intermediate-member at substantially a right angle to the said line, including a stepped gauge-plate.

6. A reciprocating fixture for grinding the teeth of chasers, having a chaser-carriage, chaser-holders mounted therein, means connected with the respective chaser-holders for positioning the chasers mounted therein in stepped interrelation so that their teeth will track, a swiveled intermediate-member upon which the said carriage slides, a base-member upon which the intermediate-member is swiveled, means for turning the said intermediate-member upon a center to bring the chaser-teeth into parallelism with the line on which the fixture reciprocates, and a mechanism mounted in the said intermediate-member for a step-by-step movement of the carriage at substantially a right angle to the said line.

7. A reciprocating fixture for grinding the teeth of chasers, having a chaser-carriage, chaser-holders mounted therein, means connected with the respective chaser-holders for positioning the chasers mounted therein in stepped interrelation so that their teeth will track, a swiveled intermediate-member upon which the said carriage slides, a base-member upon which the intermediate-member is swiveled, means for turning the said intermediate-member upon a center to bring the chaser-teeth into parallelism with the line on which the fixture reciprocates, and means for a step-by-step movement of the carriage at substantially a right angle to the said line, including a gauge-plate and a gauge-plate feeding mechanism, both mounted in the said intermediate-member.

8. A reciprocating fixture for grinding the teeth of chasers, having a chaser-carriage, chaser-holders mounted therein, means connected with the respective chaser-holders for positioning the chasers mounted therein in stepped interrelation so that their teeth will track, a swiveled intermediate-member upon which the said carriage slides, a base-member upon which the intermediate-member is swiveled, means for turning the said intermediate-member upon a center to bring the chaser-teeth into parallelism with the line on which the fixture reciprocates, means for a step-by-step movement of the carriage at substantiallly a right angle to the said line, including an abutment on the said carriage, a stepped gauge-plate mounted in the intermediate-member in position to have its steps successively engaged by the said abutment, and mechanism for feeding the gauge-plate so as to successively present its steps to the abutment.

9. A reciprocating fixture for grinding the teeth of chasers, having a chaser-carriage, a plurality of chaser-holders mounted therein, means for independently adjusting the said chaser-holders for positioning the chasers carried thereby in stepped interrelation so that their teeth will track, a swiveled intermediate-member upon which the said carriage has rectilinear movement, means for turning the said intermediate-member upon a center to bring the chaser-teeth into parallelism with the line on which the fixture reciprocates, a base-member mounting the said intermediate-member, and means for a step-by-step movement of the chaser-carriage at substantially a right angle to the said line, including a stepped gauge-plate mounted in the said intermediate-member and provided with a series of ratchet-teeth, a pawl also carried by the said intermediate-member and successively engaging with the said ratchet-teeth of the gauge-plate, and an abutment carried by the chaser-carriage and co-acting with the steps of the gauge-plate to control the step-by-step movement of the carriage.

10. A reciprocating fixture for grinding the teeth of chasers, having a chaser-carriage, a plurality of chaser-holders mounted therein, means for independently adjusting the said chaser-holders for positioning the chasers carried thereby in stepped interrelation so that their teeth will track, a swiveled intermediate-member upon which the said carriage has rectilinear movement, means for turning the said intermediate-member upon a center to bring the chaser-teeth into parallelism with the line on which the fixture reciprocates, a base-member mounting the said intermediate-member, and means for a step-by-step movement of the chaser-carriage at substantially a right angle to the said line, including a stepped gauge-plate mounted in the said intermediate-member and provided with a series of ratchet-teeth, a sliding gauge-plate, a feed-bar also carried by the said intermediate-member, a pawl carried by the said bar in position to successively engage with the ratchet-teeth of the said gauge-plate, an abutment on the chaser-carriage co-acting with the steps of the gauge-plate to control the step-by-step movement of the carriage, and a spring interposed between the chaser-carriage and intermediate-member for maintaining the said abutment against the steps of the gauge-plate.

11. A reciprocating fixture for grinding the teeth of chasers, having a chaser-carriage, a plurality of chaser-holders mounted therein, means for independently adjusting the said chaser-holders for positioning the chasers carried thereby in stepped interrelation so that their teeth will track, a swiveled intermediate-member upon which the said carriage has rectilinear movement, means for turning the said intermediate-member upon a center to bring the chaser-teeth into parallelism with the line on which the fixture reciprocates, a base-member mounting the said intermediate-member, means for a step-by-step movement of the chaser-carriage at substantially a right angle to the said line, a worm-wheel sector carried by the intermediate-member, a worm carried by the base-member and engaging with the said sector, and means connected with the worm for indicating the angle to which the intermediate-member is turned with respect to the base-member.

12. A reciprocating fixture for grinding the teeth of chasers, having a chaser-carriage, a plurality of chaser-holders mounted therein, means for independently adjusting the said chaser-holders for positioning the chasers carried thereby in stepped interrelation so that their teeth will track, means for indicating the amount to which they have been stepped, a pivotal intermediate-member upon which the said carriage has rectilinear movement, means for turning the said intermediate-member upon its pivot to bring the chaser-teeth into parallelism with the line on which the fixture reciprocates, a base-member upon which the said intermediate-member turns, means for indicating the angle to which the said intermediate-member is turned with respect to the said base-member, a spring for a step-by-step movement of the chaser-carriage, a stepped gauge-plate controlling the action of the said spring, and means for the step-by-step movement of the gauge-plate.

In testimony whereof, I have signed this specification.

ALBERT F. BREITENSTEIN.